(12) United States Patent
Arakawa (10) Patent No.: US 8,330,429 B2
(45) Date of Patent: Dec. 11, 2012

(54) DISCHARGE MECHANISM AND VEHICLE INCLUDING A CLASP TO SHORT CIRCUIT AND DISCHARGE A SMOOTHING CAPACITOR DURING VEHICLE COLLISION

(75) Inventor: Hiroshi Arakawa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 386 days.

(21) Appl. No.: 12/654,149

(22) Filed: Dec. 11, 2009

(65) Prior Publication Data

US 2010/0200377 A1    Aug. 12, 2010

(30) Foreign Application Priority Data

Feb. 9, 2009    (JP) .................... 2009-027542

(51) Int. Cl.
*H02J 7/00* (2006.01)
(52) U.S. Cl. ...................... 320/166; 320/167
(58) Field of Classification Search .......... 320/166, 320/167; 200/61.45 R, 61.48–61.53
See application file for complete search history.

(56) References Cited

U.S. PATENT DOCUMENTS

| 6,548,972 | B2* | 4/2003 | Takagi ................. 318/293 |
| 6,819,066 | B2* | 11/2004 | Ishikawa et al. ........... 318/139 |
| 7,645,145 | B2* | 1/2010 | Soma et al. ............... 439/76.2 |
| 2003/0111971 | A1* | 6/2003 | Ishikawa et al. ........... 318/139 |
| 2009/0075520 | A1* | 3/2009 | Soma et al. ............... 439/660 |
| 2011/0139595 | A1* | 6/2011 | Ishigaki .................. 200/52 R |
| 2012/0222910 | A1* | 9/2012 | Miyagawa et al. .......... 180/291 |

FOREIGN PATENT DOCUMENTS

| JP | A-2001-145202 | 5/2001 |
| JP | A-2003-189415 | 7/2003 |
| JP | A-2006-224772 | 8/2006 |

* cited by examiner

*Primary Examiner* — Edward Tso
*Assistant Examiner* — Manuel Hernandez
(74) *Attorney, Agent, or Firm* — Oliff & Berridge, PLC (57) ABSTRACT

A discharge mechanism including: a smoothing capacitor; a first terminal and a second terminal that are provided at both end sides of the smoothing capacitor respectively; and a short-circuiting clasp that is disposed apart from the first terminal and the second terminal by a predetermined clearance to short-circuit the first terminal and the second terminal to each other. The short-circuiting clasp is disposed so as to move in such a direction as to approach the first terminal and the second terminal through application of an external force to the short-circuiting clasp, and to discharge electric charges accumulated on the smoothing capacitor through abutment of the short-circuiting clasp on the first terminal and the second terminal.

11 Claims, 6 Drawing Sheets

DISCHARGE MECHANISM AND VEHICLE INCLUDING A CLASP TO SHORT CIRCUIT AND DISCHARGE A SMOOTHING CAPACITOR DURING VEHICLE COLLISION

INCORPORATION BY REFERENCE

The disclosure of Japanese Patent Application No. 2009-027542 filed on Feb. 9, 2009 including the specification, drawings and abstract is incorporated herein by reference in its entirety.

BACKGROUND OF THE INVENTION

1. Field of the Invention

The invention relates to a discharge mechanism. For example, the invention relates to a discharge mechanism that discharges electric charges accumulated on a smoothing capacitor in the event of a collision of a vehicle, and to the vehicle.

2. Description of the Related Art

A vehicle mounted with a power train called a hybrid system as a combination of an engine (it is assumable to employ a known engine such as a gasoline engine, a diesel engine, or the like) and an electric motor has been developed and put to practical use. In this vehicle, a changeover between operation by the engine and operation by the electric motor is automatically made regardless of an amount by which an accelerator is operated by a driver. Thus, the vehicle is controlled with the highest efficiency.

For example, in the case where the engine is operated in a stationary state to rotate a generator for charging a secondary battery (a battery) or is intermittently operated during running in accordance with a charge amount of the secondary battery or the like, the operation and stoppage of the engine is repeated regardless of the amount by which the accelerator is operated by the driver. That is, an improvement in fuel consumption and a substantial reduction in the emission of exhaust gas can be achieved by operating the engine and the electric motor individually or in cooperation with each other.

In this hybrid vehicle, an electric vehicle, and also a fuel-cell vehicle, a direct-current electric power of the battery is converted into an alternating-current electric power by an inverter, and this electric power is supplied to a three-phase alternating-current motor (a motor generator). Further, during generation of the electric power, in opposition to the flow of this electric power, an alternating electric power generated by the three-phase alternating-current motor (the motor generator) is converted into a direct-current electric power by the inverter to charge the battery. Besides, in the process of this electric power conversion, a voltage may be boosted or lowered. The vehicle may also be equipped with a DC/DC converter to boost/lower the voltage (for the sake of transformation).

Such an electric circuit (an electric power line) is provided with a smoothing capacitor for reducing noise. The smoothing capacitor is pre-charged with a high-voltage electric power, and creates an effect of reducing a rush current flowing into the inverter. In a vehicle (a hybrid vehicle, an electric vehicle, or a fuel-cell vehicle) mounted with this electric circuit (i.e., an electric circuit having a high-voltage storage mechanism), when an accident such as a collision or the like occurs, a baneful influence of high voltage needs to be excluded.

In Japanese Patent Application Publication No. 2006-224772 (JP-A-2006-224772), there is disclosed an art for discharging electric charges accumulated on a smoothing capacitor in the event of a collision of a vehicle using a discharge relay that turns on when the collision occurs.

Further, in Japanese Patent Application Publication No. 2003-189415 (JP-A-2003-189415), there is disclosed an art for moving a fuel cell or a battery accommodation case upon application of an abnormal external force thereto, short-circuiting a positive electrode of the fuel cell to a negative electrode thereof, and thereby consuming accumulated electric energy.

Further, in Japanese Patent Application Publication No. 2001-145202 (JP-A-2001-145202), there is disclosed an art for opening an open port of a conductive member accommodation container, discharging a conductive member into a battery accommodation container, and short-circuiting electrodes of each cell to each other when a short-circuiting request determination unit determines that there is a request for short-circuiting.

However, while electric charges accumulated on the smoothing capacitor in the event of a collision of the vehicle need to be quickly discharged upon the collision, an electric power supply device disclosed in Japanese Patent Application Publication No. 2006-224772 (JP-A-2006-224772) is provided with a circuit that controls the discharge relay to an energized state in accordance with a result of detection of a collision of the vehicle by a controller. Thus, the discharge relay may not be controlled when the controller is damaged. Further, the art disclosed in Japanese Patent Application Publication No. 2003-189415 (JP-A-2003-189415) and the art disclosed in Japanese Patent Application Publication No. 2001-145202 (JP-A-2001-145202) both relate to the batteries. These publications do not disclose any art for discharging electric charges accumulated on a smoothing capacitor.

SUMMARY OF THE INVENTION

The invention provides a discharge mechanism and a vehicle that make it possible to quickly discharge electric charges accumulated on a smoothing capacitor.

A first aspect of the invention relates to a discharge mechanism. The discharge mechanism is equipped with a smoothing capacitor, a first terminal and a second terminal that are provided at both end sides of the smoothing capacitor respectively, and a short-circuiting clasp that is disposed apart from the first terminal and the second terminal by a predetermined clearance to short-circuit the first terminal and the second terminal to each other. The short-circuiting clasp is so disposed as to move in such a direction as to approach the first terminal and the second terminal through application of an external force to the short-circuiting clasp, and to discharge electric charges accumulated on the smoothing capacitor through abutment of the short-circuiting clasp on the first terminal and the second terminal.

A second aspect of the invention relates to a discharge mechanism. The discharge mechanism is equipped with a battery, a vehicular drive motor that is connected in parallel with the battery, a control circuit that is connected in parallel between the battery and the drive motor and includes a converter circuit and an inverter circuit having a smoothing capacitor, a first terminal and a second terminal that are provided at both ends of the smoothing capacitor respectively, and a short-circuiting clasp that is disposed apart from the first terminal and the second terminal by a predetermined clearance to short-circuit the first terminal and the second terminal to each other. The short-circuiting clasp is so disposed as to move in such a direction as to approach the first terminal and the second terminal through application of an external force to the short-circuiting clasp, and to discharge electric charges accumulated on the smoothing capacitor through abutment of the short-circuiting clasp on the first terminal and the second terminal.

According to the discharge mechanism based on the invention, the short-circuiting clasp moves to the terminal sides and thereby comes into contact with the first terminal and the second terminal, so that the first terminal and the second terminal can be short-circuited to each other. As a result, electric charges accumulated on the smoothing capacitor can be quickly discharged.

A third aspect of the invention relates to a vehicle. The vehicle has the discharge mechanism according to the foregoing second aspect of the invention. The short-circuiting clasp is disposed in front of and/or behind the vehicle in the discharge mechanism.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF AN EMBODIMENT

A discharge mechanism according to the embodiment of the invention will be described with reference to the drawings. In the case where a specific number, amount, or the like is mentioned in the following description of the embodiment of the invention, the scope of the invention should not necessarily be limited to that number, amount, or the like unless otherwise noted. Further, like or equivalent components are denoted by the same reference numerals respectively, and the same description is not repeated.

Figure 1:
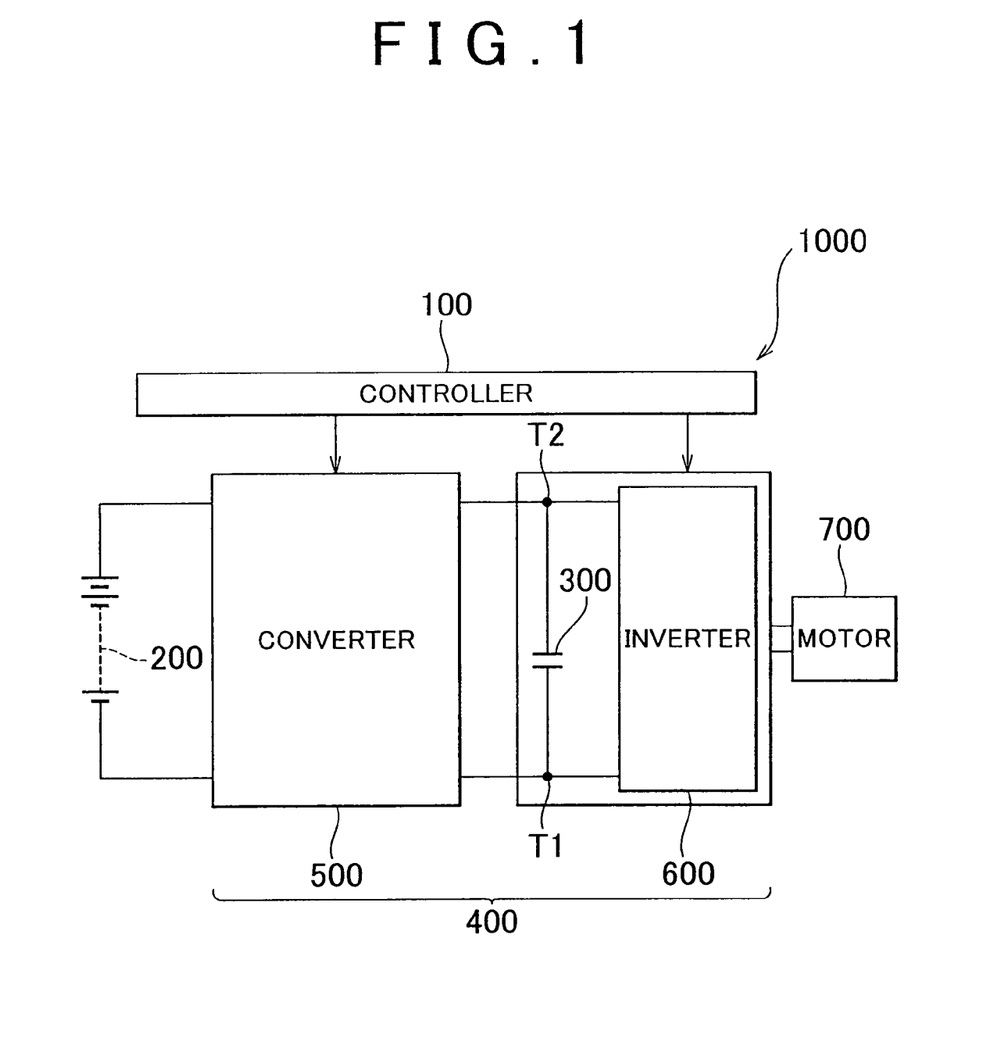
FIG. 1 is a block diagram showing a configuration of an electric power supply device of a vehicle according to the embodiment of the invention.

First of all, referring to FIG. 1, the outline of a circuitry of an electric power supply device of a vehicle according to the embodiment of the invention will be described. An electric power supply device 1000 of this vehicle has a converter circuit 500, an inverter circuit 600, a three-phase alternating-current motor (a drive motor for the vehicle) 700, a smoothing capacitor 300 for the inverter circuit 600, and a battery 200.

The converter circuit 500, the inverter circuit 600, and the smoothing capacitor 300 are connected in parallel between the battery 200 and the three-phase alternating-current motor 700. A control circuit 400 having the converter circuit 500 and the inverter circuit 600 is controlled by a controller 100. The vehicle should not be limited in particular as long as the three-phase alternating-current motor 700 is employed as a drive source for the vehicle. For example, the vehicle may be a hybrid vehicle or an electric vehicle.

The converter circuit 500 is a circuit that boosts a direct-current voltage of the battery 200 to a predetermined voltage on the basis of a control signal received from the controller 100. The inverter circuit 600 is a circuit that converts into an alternating-current electric power a direct-current electric power whose voltage has been boosted by the converter circuit 500, on the basis of a control signal received from the controller 100. The three-phase alternating-current motor 700 generates a driving force for the vehicle through the alternating-current electric power supplied from the inverter circuit 600.

The smoothing capacitor 300 is provided between the battery 200 and the inverter circuit 600. In this embodiment of the invention, the smoothing capacitor 300 is provided between the converter circuit 500 and the inverter circuit 600, and is connected in parallel with the inverter circuit 600. The smoothing capacitor 300 serves to hold the output voltage of the battery 200 constant against load fluctuations and noise.

Figure 2:
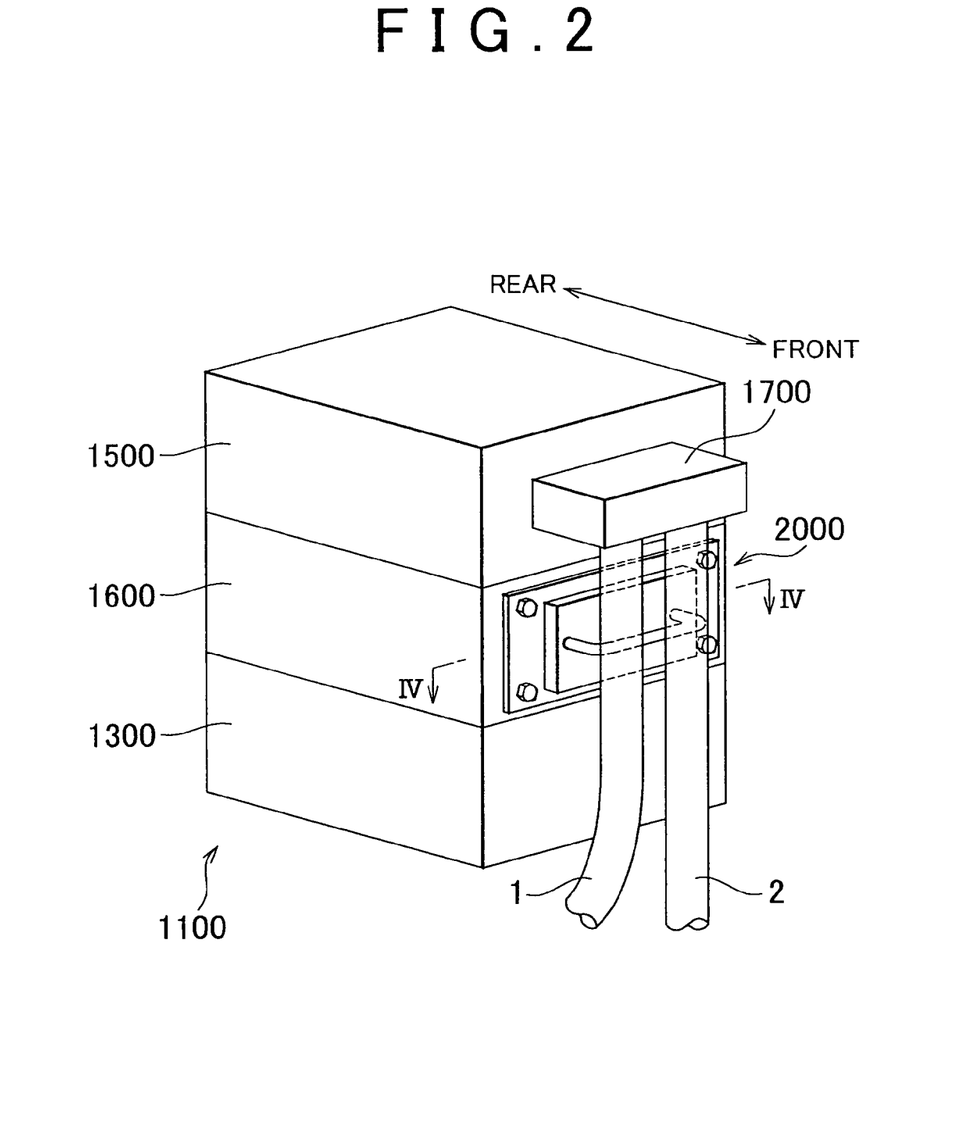
FIG. 2 is an overall perspective view showing a construction of an electric power supply unit adopting a discharge mechanism, which is mounted on the vehicle according to the embodiment of the invention.
Figure 3:
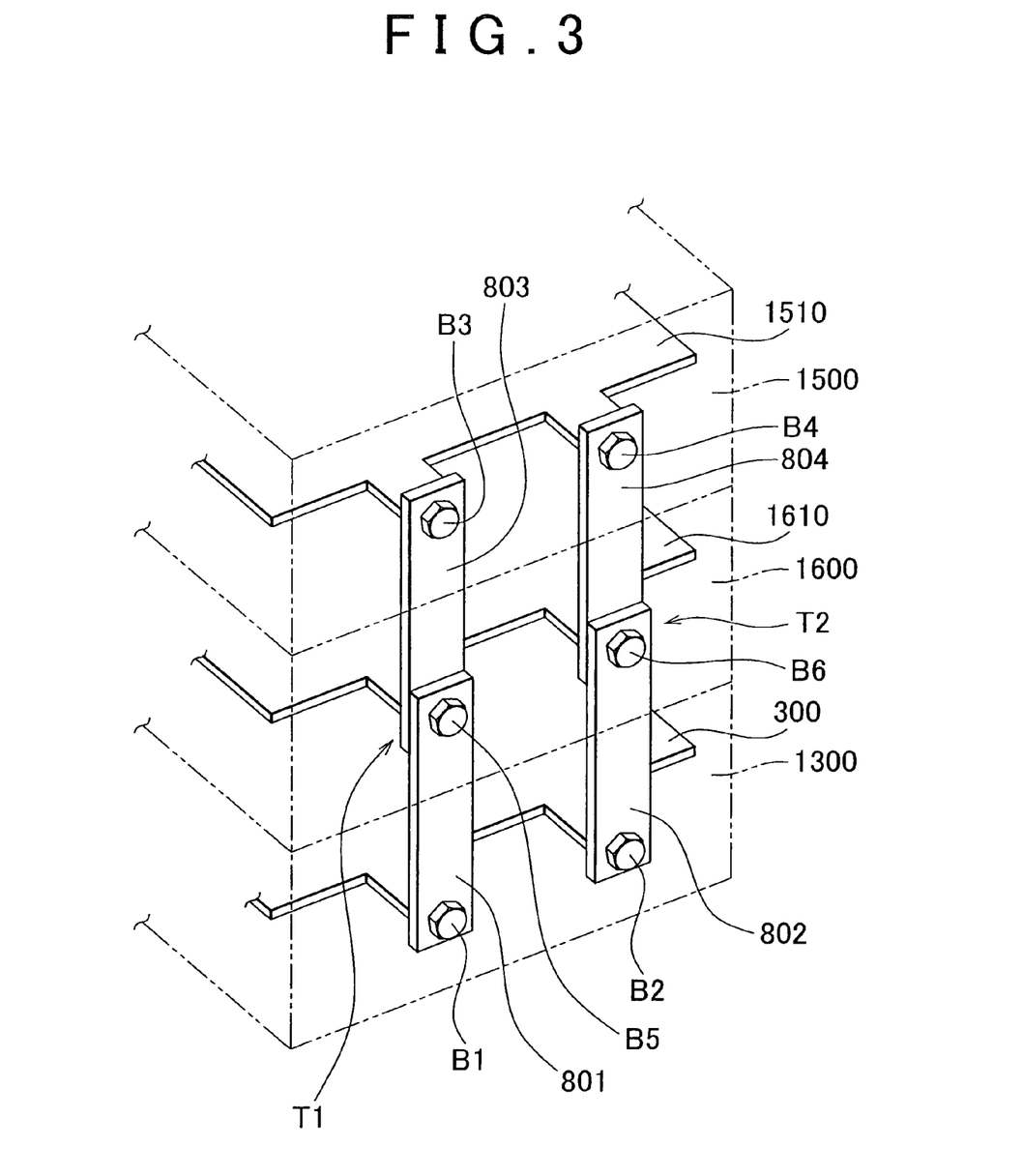
FIG. 3 is a schematic view showing an internal construction of the electric power supply unit adopting the discharge mechanism, which is mounted on the vehicle according to the embodiment of the invention.

Next, referring to FIGS. 2 and 3, an electric power supply unit 1100 in which part of the electric power supply device 1000 is accommodated will be described. This electric power supply unit 1100 includes a first box 1300 for accommodating the smoothing capacitor 300, a second box 1600 that is laminated on the first box 1300 to accommodate a substrate 1610 having the inverter circuit 600, and a third box 1500 that is laminated on the second box 1600 to accommodate a substrate 1510 having the converter circuit 500.

In general, the substrate 1610 is referred to as a substrate for an intelligent power module (IPM). Further, the third box 1500 is provided with an inlet 1700. Input cables 1 and 2 are connected to the inlet 1700 by means of connectors or the like. It should be noted that the input cables 1 and 2 are provided on a front side in a traveling direction of the vehicle in this embodiment of the invention.

The smoothing capacitor 300 and the substrate 1610 are electrically connected to each other by electrode plates 801 and 802. Further, the substrate 1610 and the substrate 1510 are electrically connected to each other by electrode plates 803 and 804. The respective electrode plates 801 to 804 are fixed to a terminal of the smoothing capacitor 300 and terminals of the substrates, using bolts B1 to B6 as fasteners respectively.

Fastening locations where the bolts B5 and B6 are used constitute a first terminal T1 and a second terminal T2 respectively. An opening portion 1601 (see FIG. 4) exposing the first terminal T1 and the second terminal T2 is formed through that lateral face of the second box 1600 which faces the first terminal T1 and the second terminal T2. Furthermore, the opening portion 1601 is fitted with a discharge unit 2000.

Figure 4:
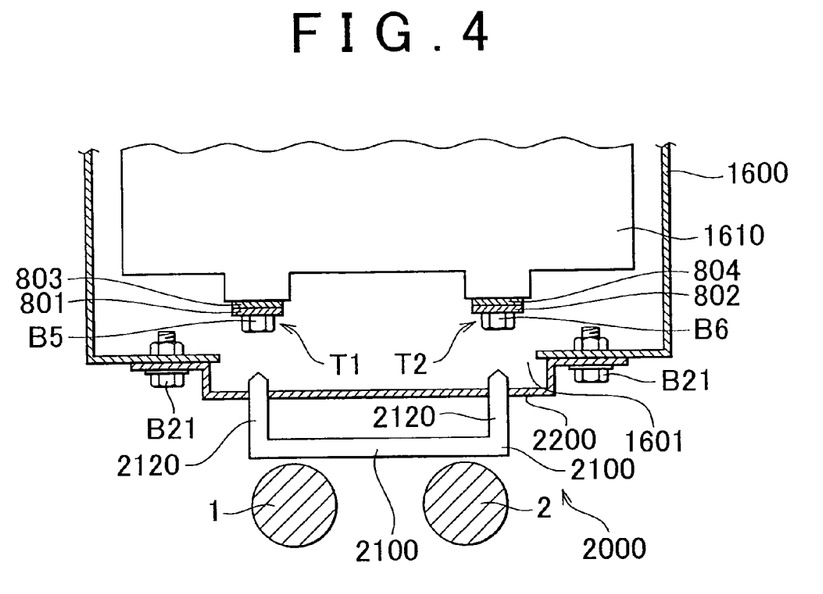
FIG. 4 is a cross-sectional view taken along a line IV-IV indicated by arrows in FIG. 2.
Figure 5:
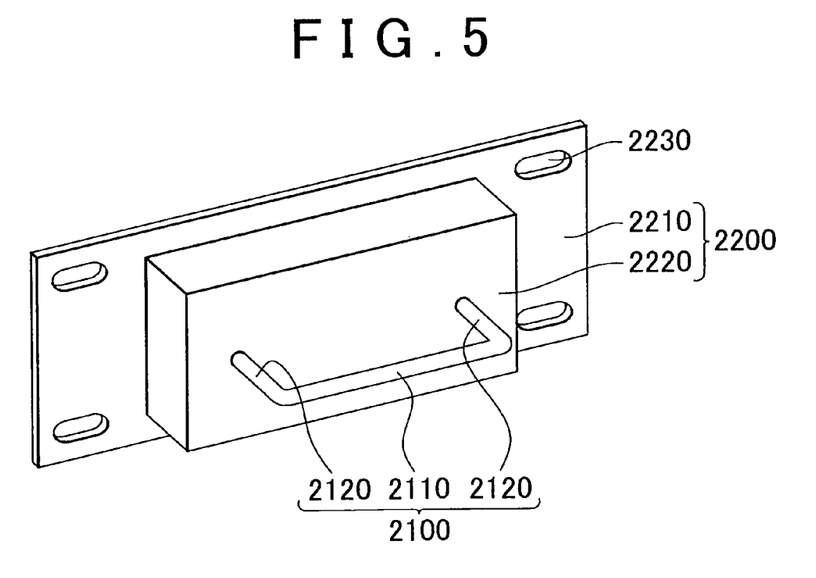
FIG. 5 is a perspective view showing a construction of a plate employed in the discharge mechanism according to the embodiment of the invention.

Referring to FIGS. 4 and 5, the discharge unit 2000 has a short-circuiting clasp 2100 for short-circuiting the first terminal T1 and the second terminal T2 to each other, and a retention plate 2200 that retains the short-circuiting clasp 2100. The short-circuiting clasp 2100 has a rectilinear portion 2110, and abutment portions 2120 that are bent from both ends of the rectilinear portion 2110 toward the first terminal T1 and the second terminal T2 respectively.

The retention plate 2200 is designed as a resin molded product or the like, and retains the short-circuiting clasp 2100. The retention plate 2200 has a convex bulge portion 2220 that swells outward from the second box 1600, and a flange portion 2210 that surrounds a periphery of the bulge portion 2220 and swells outward toward the bulge portion 2220. Elongated bolt fastening holes 2230 are provided through four corners of the flange portion 2210 respectively, and the retention plate 2200 is fixed to the second box 1600 by means of bolts B21.

As shown in FIG. 4, in a state where the retention plate 2200 is fixed to the second box 1600, tips of the abutment portions 2120 of the short-circuiting clasp 2100 are retained by the retention plate 2200 at positions distant from the first terminal T1 and the second terminal T2 by a predetermined clearance respectively. It should be noted that the retention plate 2200 assumes a hat-like shape as shown in FIG. 5 for the purpose of spacing the tips of the abutment portions 2120 of the short-circuiting clasp 2100 apart from the first terminal T1 and the second terminal T2 by the predetermined clearance respectively. Accordingly, in the case where the tips of the abutment portions 2120 can be spaced apart from the first terminal T1 and the second terminal T2 by the predetermined clearance respectively, the retention plate 2200 can also assume a flat shape or other shapes.

Figure 6:
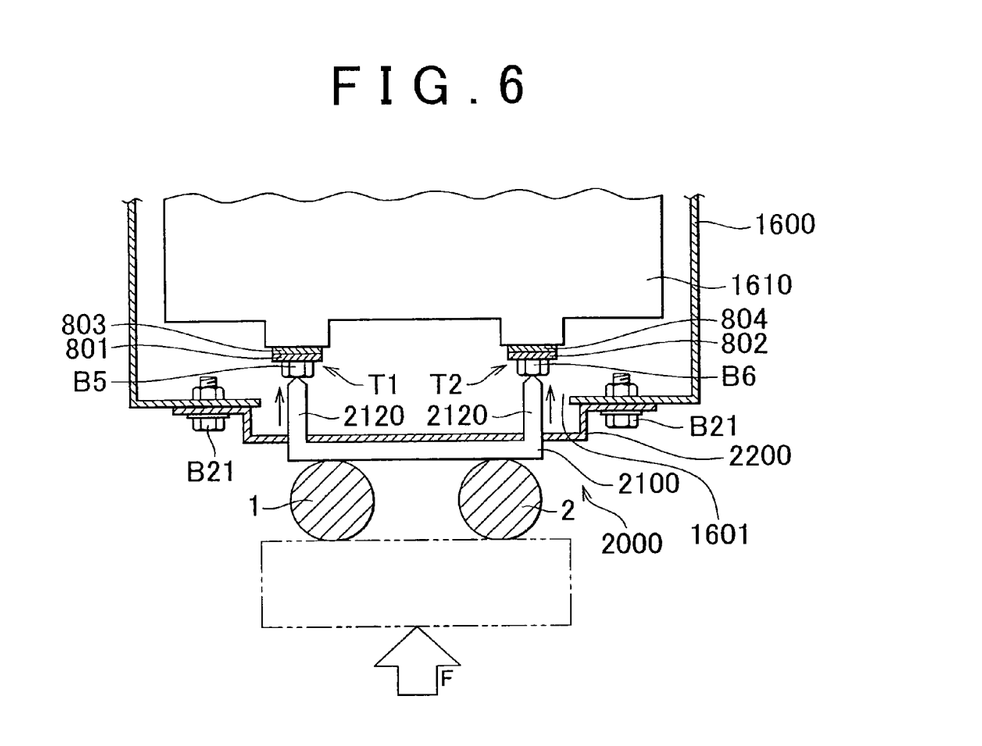
FIG. 6 is a cross-sectional view corresponding to a cross-section taken along the line IV-IV indicated by the arrows in FIG. 2, showing a state of movement of a short-circuiting clasp in the event of a collision of the vehicle.

As shown in FIG. 6, when, for example, a collision of the vehicle causes the input cables 1 and 2 to be pressed against a rear side through application of an external force thereto, the input cables 1 and 2 are pressed toward the short-circuiting clasp 2100 side. As a result, the input cables 1 and 2 come into abutment on the short-circuiting clasp 2100, and an external force F is applied to the short-circuiting clasp 2100.

Thus, the tips of the abutment portions 2120 of the short-circuiting clasp 2100 move in such directions as to approach the first terminal T1 and the second terminal T2 respectively, and the short-circuiting clasp 2100 comes into abutment on the first terminal T1 and the second terminal T2. As a result, the first terminal T1 and the second terminal T2 are short-circuited to each other, and electric charges accumulated on the smoothing capacitor 300 are discharged.

In this manner, according to the electric power supply unit 1100 adopting the discharge unit 2000 of this embodiment of the invention, the short-circuiting clasp 2100 moves toward the terminals T1 and T2 sides, and the first terminal T1 and the second terminal T2 can thereby be short-circuited to each other. As a result, electric charges accumulated on the smoothing capacitor 300 can be quickly discharged.

In the foregoing embodiment of the invention, the case where the electric power supply unit 1100 adopts the discharge mechanism designed such that the short-circuiting clasp 2100 is caused to abut on the terminals T1 and T2 with the aid of the opening portion 1601 provided through the lateral face of the second box 1600 has been described. However, this embodiment of the invention is nothing short of an example, and the invention should not be limited to this construction. For example, it is also possible to provide a lateral face of the first box 1300 with an opening portion exposing the bolts B1 and B2, and mount the first box 1300 with the discharge unit 2000 using the bolts B1 and B2 as the first terminal T1 and the second terminal T2 respectively. Further, the same holds true for the third box 1500.

Figure 7:
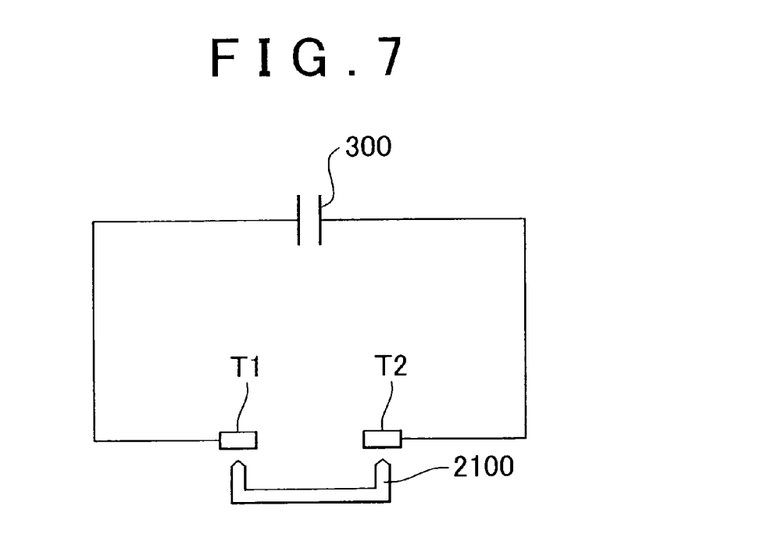
FIG. 7 is a first schematic diagram for illustrating an essential part of the invention.
Figure 8:
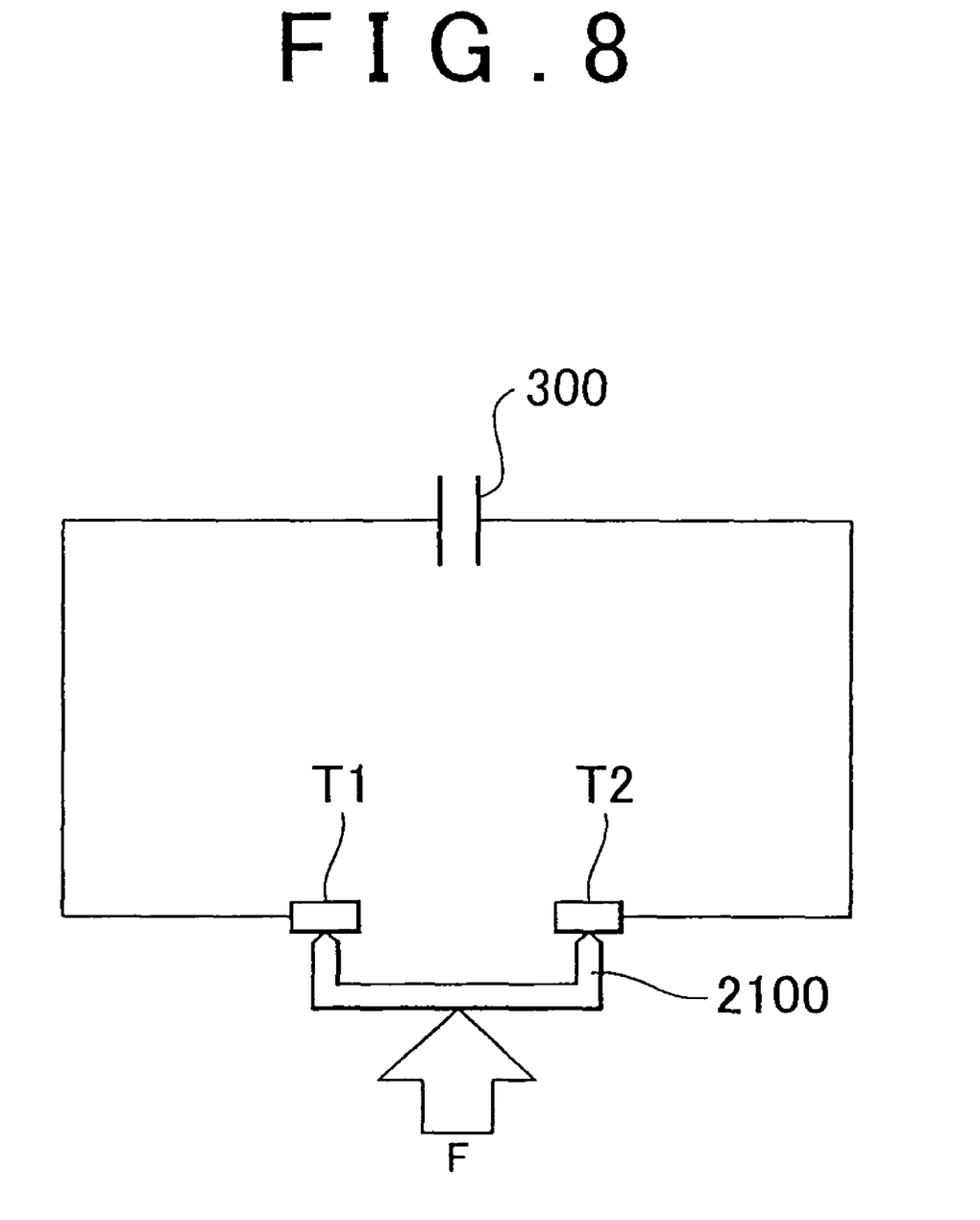
FIG. 8 is a second schematic diagram for illustrating the essential part of the invention.

The gist of the invention first consists in that the smoothing capacitor 300, the first terminal T1 and the second terminal T2 that are provided on both the end sides of the smoothing capacitor 300 respectively, and the short-circuiting clasp 2100 that is disposed apart from the first terminal T1 and the second terminal T2 by the predetermined clearance to short-circuit the first terminal T1 and the second terminal T2 to each other are provided as shown in FIG. 7. In this configuration, the gist of the invention consists in that the short-circuiting clasp 2100 moves in such a direction as to approach the first terminal T1 and the second terminal T2 and comes into abutment thereon through application of the external force F to the short-circuiting clasp 2100 as shown in FIG. 8 and electric charges accumulated on the smoothing capacitor 300 are thereby discharged.

Thus, in this embodiment of the invention, as an example, the case where the input cables 1 and 2 are pressed toward the short-circuiting clasp 2100 side has been described. However, it is also assumable that the short-circuiting clasp 2100 be pressed by another member. Further, the case where the input cables 1 and 2 are provided on the front side in the traveling direction of the vehicle has been described. However, the external force should not necessarily be applied to the short-circuiting clasp 2100 from the front side in the direction of travel of the vehicle. This external force may be applied to the short-circuiting clasp 2100 from various sides such as a lateral side, a rear side, and the like.

While the invention has been described with reference to the example embodiment thereof, it is to be understood that the invention is not limited to the described embodiment or construction. To the contrary, the invention is intended to cover various modifications and equivalent arrangements. In addition, while the various elements of the example embodiment are shown in various combinations and configurations, other combinations and configurations, including more, less or only a single element, are also within the scope of the invention.

What is claimed is:

1. A discharge mechanism comprising:
   a battery;
   a vehicular drive motor that is connected in parallel with the battery;
   a control circuit that is connected in parallel between the battery and the drive motor and includes a converter circuit and an inverter circuit having a smoothing capacitor;
   a first terminal and a second terminal that are provided at both ends of the smoothing capacitor respectively; and
   a short-circuiting clasp that is disposed apart from the first terminal and the second terminal by a predetermined clearance to short-circuit the first terminal and the second terminal to each other, wherein
   the short-circuiting clasp is disposed as so to move in such a direction as to approach the first terminal and the second terminal through application of an external force to the short-circuiting clasp, and to discharge electric charges accumulated on the smoothing capacitor through abutment of the short-circuiting clasp on the first terminal and the second terminal,
   the control circuit has connected thereto an input cable that is located on the opposite side of the short-circuiting clasp from the first terminal and the second terminal, and
   the input cable is pressed toward the short-circuiting clasp side to thereby abut on the short-circuiting clasp and apply the external force thereto.

2. The discharge mechanism according to claim 1 further comprising:
   a box that accommodates the first terminal and the second terminal and has an opening portion exposing the first terminal and the second terminal; and
   a retention plate that is mounted on the box to retain the short-circuiting clasp apart from the first terminal and the second terminal by a predetermined clearance.

3. The discharge mechanism according to claim 1 further comprising:
- a first box that accommodates the smoothing capacitor;
- a second box that is laminated on the first box to accommodate a substrate having the inverter circuit; and
- a third box that is laminated on the second box to accommodate a substrate having the converter circuit,
- wherein the second box accommodates the first terminal and the second terminal, is provided with an opening portion exposing the first terminal and the second terminal, and is mounted with a retention plate that retains the short-circuiting clasp, and
- wherein the third box is provided with an inlet to which the input cable is connected.

4. The discharge mechanism according to claim 3, wherein the retention plate is that region of the second box which protrudes outward.

5. The discharge mechanism according to claim 1 further comprising:
- a first box that accommodates the smoothing capacitor;
- a second box that is laminated on the first box to accommodate a substrate having the inverter circuit; and
- a third box that is laminated on the second box to accommodate a substrate having the converter circuit,
- wherein the third box accommodates the first terminal and the second terminal, is provided with an opening portion exposing the first terminal and the second terminal, and is mounted with a retention plate that retains the short-circuiting clasp, and
- wherein the third box is provided with an inlet to which the input cable is connected.

6. The discharge mechanism according to claim 5, wherein the retention plate is that region of the third box which protrudes outward.

7. The discharge mechanism according to claim 1 further comprising:
- a first box that accommodates the smoothing capacitor;
- a second box that is laminated on the first box to accommodate a substrate having the inverter circuit; and
- a third box that is laminated on the second box to accommodate a substrate having the converter circuit,
- wherein the first box accommodates the first terminal and the second terminal, is provided with an opening portion exposing the first terminal and the second terminal, and is mounted with a retention plate that retains the short-circuiting clasp, and
- wherein the third box is provided with an inlet to which the input cable is connected.

8. The discharge mechanism according to claim 7, wherein the retention plate is that region of the first box which protrudes outward.

9. The discharge mechanism according to claim 1, wherein the short-circuiting clasp has a rectilinear portion, and abutment portions that are bent from both ends of the rectilinear portion toward the first terminal and the second terminal respectively.

10. A vehicle comprising the discharge mechanism according to claim 1, wherein the short-circuiting clasp is disposed in a forward portion of the vehicle or in a rearward portion of the vehicle in the discharge mechanism.

11. The vehicle according to claim 10, further comprising:
- a controller that controls a control circuit having the converter circuit and the inverter circuit; and
- a three-phase alternating-current motor as a drive source of the vehicle,
- wherein the converter circuit is a circuit that boosts a direct current of the battery to a predetermined voltage on a basis of a control signal received from the controller,
- wherein the inverter circuit is a circuit that converts into an alternating-current electric power a direct-current electric power whose voltage is boosted by the converter circuit, on a basis of a control signal received from the controller, and
- wherein the three-phase alternating-current motor generates a driving force for the vehicle through the alternating-current electric power supplied from the inverter circuit.

\* \* \* \* \*